(12) United States Patent
Schreffler et al.

(10) Patent No.: US 6,451,935 B1
(45) Date of Patent: *Sep. 17, 2002

(54) HIGHLY FUNCTIONALIZED POLYMERS AND A PROCESS FOR MAKING THE SAME

(75) Inventors: John R. Schreffler, Clinton; Mark L. Stayer, Jr., Suffield; Thomas A. Antkowiak, Wadsworth, all of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/568,639

(22) Filed: May 10, 2000

(51) Int. Cl.$^7$ .............................. C08F 4/94; C08F 36/00
(52) U.S. Cl. ...................... 526/123.1; 526/217; 526/83; 525/331.9; 525/332.8; 525/333.6
(58) Field of Search ............................. 526/123.1, 217, 526/83; 525/331.9, 332.8, 333.6

(56) References Cited

U.S. PATENT DOCUMENTS

| | | | |
|---|---|---|---|
| 3,976,628 A | 8/1976 | Halasa et al. | 526/22 |
| 4,975,491 A | 12/1990 | Quirk | 525/288 |
| 5,274,106 A | 12/1993 | Lawson et al. | 548/300.1 |
| 5,420,219 A | 5/1995 | Lawson et al. | 526/340 |
| 5,436,290 A | 7/1995 | Lawson et al. | 524/575 |
| 5,496,940 A | 3/1996 | Lawson et al. | 540/450 |
| 5,502,131 A | 3/1996 | Antkowiak et al. | 526/180 |
| 5,519,086 A | 5/1996 | Lawson et al. | 524/575 |
| 5,523,371 A | 6/1996 | Lawson et al. | 526/340 |
| 5,700,888 A | * 12/1997 | Hall | 526/190 |

FOREIGN PATENT DOCUMENTS

| | | | |
|---|---|---|---|
| DE | 1911886 | 11/1969 | C08G/33/20 |
| DE | 158782 | 2/1983 | C08F/8/46 |
| EP | 0475495 | 3/1992 | C08F/8/00 |
| EP | 0742232 | 11/1996 | C08F/4/48 |
| WO | WO9636650 | 11/1996 | C08F/8/42 |
| WO | WO9828347 | 7/1998 | C08F/8/42 |

OTHER PUBLICATIONS

"Butyl lithium–Initiated Polymerization of Styrene: Effect of Lithium Butoxide," by Roovers et al., Trans. Faraday Soc., vol. 62, pp. 1876–1880 (1966).

"The Polymerization of Isoprene with sec–butyllithium in Hexane" by Roovers et al., Macromolecules, vol. 1, No. 4, pp. 328–331 (1968).

"Effect of Lithium Alkoxide and Hydroxide on polymerization Initiated with Alkyllithium" by Hsieh, Journal of Polymer Science: Part A–1, vol. 8, pp. 533–543 (1970).

"Recent Advances in Anionic synthesis of Functionalized Polymers" by Quirk et al., Rubber Chemistry & Technology, vol. 64, pp. 648–660 (1991).

* cited by examiner

*Primary Examiner*—James J. Seidleck
*Assistant Examiner*—Olga Asinovsky
(74) *Attorney, Agent, or Firm*—Meredith Palmer; Arthur Reginelli

(57) ABSTRACT

A process for preparing highly functionalized polymers comprising the steps of admixing anionically-polymerizable monomers and at least one anionic-polymerization initiator to form an admixture of living polymers, adding at least one lithium alkoxide stabilizer to the admixture of living polymers to form a stabilized admixture, and adding a functionalizing agent to the stabilized admixture.

18 Claims, No Drawings

HIGHLY FUNCTIONALIZED POLYMERS AND A PROCESS FOR MAKING THE SAME

FIELD OF THE INVENTION

The present invention generally relates to highly functionalized polymers and processes for making the same. More particularly, the highly functionalized polymers of this invention are prepared by using anionic polymerization techniques and then the polymers are end-functionalized in the presence of stabilization compounds. More specifically, the highly functionalized polymers prepared according to this invention are end-functionalized in the presence of at least one lithium alkoxide compound.

BACKGROUND OF THE INVENTION

It is known to use organolithium initiators to polymerize conjugated diene, triene, and monovinyl aromatic monomers. These polymerizations proceed according to anionic polymerization mechanisms. That is, these polymerization reactions generally include the reaction of monomers by nucleophilic initiation to form and propagate a polymeric structure. Throughout the formation and propagation of this polymer, the polymeric structure is ionic or "living." A living polymer, therefore, is a polymeric segment having a living or reactive end. For example, when a lithium containing initiator is employed to initiate the formation of a polymer, the reaction will produce a reactive polymer having a lithium atom at its living or reactive end.

Chain propagation of an anionically-polymerized polymer typically ceases when all available monomer is consumed or when the living end is quenched or terminated. Typically, termination occurs in the presence of an electrophilic reagent or proton donor. Also, living polymers can spontaneously terminate because their carbanion centers decay with time. Spontaneous termination is also prevalent at higher polymerization temperatures where inter-polymer coupling likewise occurs.

It is often desirable to synthesize polymers having relatively high molecular weights and relatively small molecular weight distributions. Accordingly, anionically polymerized polymers are commercially prepared in the presence of an excess of monomer and the chain propagation reaction is terminated with terminating agents after a desired chain propagation. Also, it is commercially desirable and economically efficient to prepare anionically-polymerized polymers with a minimal amount of solvent and thereby increase polymer production yield. This is especially true when continuous polymerization techniques are employed.

These high monomer concentrations, however, produce very exothermic reactions that result in very high reaction temperatures. This heat is believed to promote spontaneous termination and inter-polymer coupling, which results in the formation of low molecular weight polymers and a wide molecular weight distribution. Also, the efficacy of end-chain functionalizing reactions is reduced due to a reduction in living-polymer ends.

Accordingly, there is a need to run highly concentrated anionic polymerizations and thereby increase polymer production efficiency while maintaining the living ends of polymers until a desired end-funcitonalization is effected.

SUMMARY OF THE INVENTION

In general the present invention provides a process for preparing highly functionalized polymers comprising the steps of admixing anionically-polymerizable monomers and at least one anionic-polymerization initiator to form an admixture of living polymers, adding at least one lithium alkoxide stabilizer to the admixture of living polymers to form a stabilized admixture, and adding a functionalizing agent to the stabilized admixture.

The present invention also includes a method for functionalizing living polymers, the method comprising the steps of preparing a solution of living polymers, where the solution includes at least one lithium alkoxide stabilizer, and adding a functionalizing agent to the solution of living polymers.

The present invention further provides a highly functionalized polymer prepared by the steps comprising admixing anionically-polymerizable monomers and anionic-polymerization initiators to form an admixture of living polymers, adding at least one lithium alkoxide stabilizer to the admixture of living polymers to form a stabilized admixture, and adding a functionalizing agent to the stabilized admixture.

Advantageously, the process of the present invention overcomes many shortcomings of the prior art by end-functionalizing anionically-polymerized polymers in the presence of at least one stabilizer compound. As a result, the monomer concentration of a polymerization medium can be increased and highly functionalized polymers are obtained. Also, the amount of solvent needed to run anionic polymerizations in solution is reduced, thereby increasing the efficacy of continuous polymerization processes.

DETAILED DESCRIPTION OF ILLUSTRATIVE EMBODIMENTS

It has now been found that highly functionalized polymers can be prepared by functionalizing living polymers in the presence of at least one stabilizer compound. These compounds are believed to stabilize the reactive or living nature of the polymer and thus, once reacted with a functionalizing agent, provide a polymeric composition having an increased number of functionalized polymers. The stabilizers that are useful in practicing this invention can generally be classified as lithium alkoxide compounds, and the practice of this invention is especially useful when preparing anionically-polymerized polymers by using organolithium initiators. In one embodiment of this invention, the highly functionalized polymers are extremely useful for fabricating tires.

According to a preferred embodiment of this invention, one or more lithium alkoxides are added to a polymerization-reaction medium prior to the attainment of a peak polymerization temperature. As noted above, the use of this stabilizer is particularly useful when using organolithium compounds as initiators. Those skilled in the art will appreciate that polymerization reactions of this type are exothermic and lead to increased reaction temperatures until a peak reaction temperature is achieved. Afterwards, the reaction medium naturally begins to cool. Therefore, the lithium alkoxide stabilizers employed in this invention can be added to a polymerization medium prior to initiating polymerization or after polymerization has begun, but preferably not later than when the peak polymerization temperature is achieved.

The amount of lithium alkoxide that is added to a polymerization medium according to this invention can vary depending on the amount of initiator, the concentration of the monomers, and the expected temperature profile. In a preferred embodiment, the ratio of lithium alkoxide to lithium-containing initiator is from about 0.5:1 to about 2:1, and more preferably from about 0.8:1 to about 1.2:1.

One or more lithium alkoxides can be added to a polymerization-reaction medium in a couple of ways. First, the compounds can be added directly to a polymerization medium. This can be accomplished by adding a solution that contains one or more lithium alkoxides that are dissolved or suspended therein. Or, a composition of matter that essentially includes lithium alkoxide compounds can be added. It should be understood that the foregoing solutions, suspensions, or compositions may include individual lithium alkoxide molecules, complexes of more than one lithium alkoxide compound, reaction products of lithium alkoxide compounds, solubilized ionic species of lithium alkoxide compounds, or mixtures thereof. Therefore, the term lithium alkoxide or lithium alkoxide compositions may simply be used to refer to all of these lithium alkoxide compositions.

Alternatively, the lithium alkoxide may be added to a polymerization medium by adding reactants that will ultimately form a lithium alkoxide composition. In other words, the lithium alkoxide is formed in situ within the polymerization medium. For example, alkyllithiums and alcohols react and form lithium alkoxide. Any reference to adding lithium alkoxide to a polymerization medium will therefore refer to the addition of a lithium alkoxide composition, as discussed above, and to the addition of reactants that will form lithium alkoxide compositions.

Once the lithium alkoxide composition is added and a peak polymerization temperature is achieved, the resulting living polymers are end-functionalized. Functionalization of the living polymers can occur by reacting the living polymers with any reagent that reacts with alkyllithium to yield an addition product in which a new functionality is added to the polymer. Exemplary addition reactions include the following.

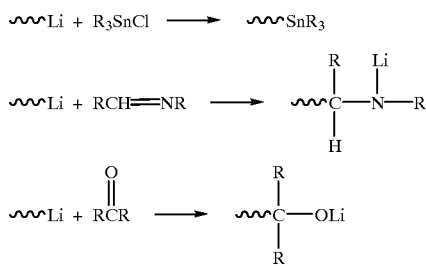

Other end-funcitonalization reactions include coupling and linking reactions that are well known in the art, as well as those discussed in greater detail hereinbelow.

With specific regard to the lithium alkoxide stabilizers employed in this invention, they are generally defined according to the formula $$Li-O-R_1$$

where Li is a lithium atom, O is an oxygen atom, and $R_1$ is a carbon-based moiety or group. The carbon-based moiety, which can also be referred to as a hydrocarbyl or organic group, can include any monovalent structure known in the field of organic chemistry so long as the structure is neutral toward a living polymer chain end. In other words, the structure will not interact strongly with or react with a living polymer. For purposes of this specification, these substituents, moieties or groups will be referred to as neutral substituents. One type of substituent that will react with a living polymer chain end, and therefore is a non-neutral substituent, is a Zerewittenoff-reactive substituent. As those skilled in the art will appreciate, a Zerewittenoff-reactive substituent, such as an active hydrogen atom, is a substituent that will react with methyl magnesium bromide. As a general rule, hydrogen atoms that are connected to oxygen, nitrogen, sulfur, or phosphorus are Zerewittenoff-reactive substituents; although this group is not exhaustive because some highly acidic carbon-hydrogen groups are Zerewittenoff-reactive substituents. For a further understanding of Zerewittenoff-reactive substituents, one can refer to ADVANCED ORGANIC CHEMISTRY REACTIONS, MECHANISMS, AND STRUCTURE, $3^{RD}$ EDITION, by Jerry March, John Wiley & Sons, Inc. (1985). Other substituents that should be avoided include carbonyls, such as esters, ketones, or aldehydes, which can react with a living chain end.

The carbon-based moieties may include aliphatic, cycloaliphatic, and aromatic groups. The aliphatic groups can be saturated, i.e., alkyl groups, or unsaturated alkenyl or alkynyl groups. The saturated groups are preferred. Further, the aliphatic groups can be straight chain or branched. Preferably, the aliphatic groups will include less than about 16 carbon atoms, more preferably from 1 to about 12 carbon atoms, and even more preferably from about 4 to about 8 carbon atoms. The cycloaliphatic groups will preferably include less than about 8 carbon atoms in the cyclic portion of the group, and more preferably from 5 to 6 carbon atoms, in the cyclic portion of the group. These cycloaliphatic groups can be substituted, which means that at least one hydrogen atom is substituted with a carbon-based moiety. These moieties preferably include less than about 12 carbon atoms, and more preferably from 1 to about 8 carbon atoms. The aromatic groups can also be substituted, which means that a hydrogen atom on the phenyl ring is substituted with a carbon-based moiety. These moieties preferably include less than about 12 carbon atoms, and more preferably from 1 to about 8 carbon atoms. Still further, the carbon-based moieties may include hetero atoms. In other words, a carbon atom within any of these moieties can be substituted or interchanged with another atom such as oxygen, sulfur, silicon, phosphorous, or nitrogen atoms.

Some organic groups include, without limitation, the following alkyl groups: methyl, ethyl, propyl, isopropyl, butyl, isobutyl, pentyl, cyclopentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 1-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2-3-3-4-tetramethylpentyl, 3-methylhexyl, 2,5-dimethylhexyl and the like.

Oxygen containing organic groups include, without limitation, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxbutyl, hexyloxypentyl, heptyloxyhexyl, heptyloxyheptyl, heptyloxyoctyl, heptyloxynonyl, heptyloxydecyl, octloxymethyl, oxtyloxyethyl, oxtyloxypropyl, oxtyloxybutyl, octyloxypentyl, oxtyloxyhexyl, octyloxyheptyl, octyloxynonyl, octyloxyoctyl, decyloxymethyl, docyloxyethyl, decyloxypropyl, decyloxybutyl, decyloxypentyl, decyloxyhexyl, and decyloxyheptyl.

Similar sulphur, silicon, phosphorous, or nitrogen containing organic groups are contemplated and are well known to those skilled in the art.

Many of the lithium alkoxide stabilizers that are useful in practicing this invention are commercially available. For example, lithium t-butoxide, lithium nonyl phenoxide, lithium phenoxide, and lithium isopropoxide can be purchased from Aldrich of Milwaukee, Wis.

When a desired lithium alkoxide compound is not commercially available, it can be easily prepared by reacting excess alkyllithium with an alcohol bearing the desired organic group. This reaction is extremely fast and can be carried out at ambient temperature in the polymerization reactor or in entry lines to the reactor.

With respect to the polymerization-reaction medium, the practice of this invention should not be limited to any particular anionic polymerization process or functionalization technique. Therefore, the polymerization medium to which the lithium alkoxide stabilizers are added can include any anionic polymerization initiator as well as any anionically-polymerizable monomers. Typically, these polymerizations are conducted in a solvent and, as often practiced in the art, in the presence of polar coordinators, randomizers, chelating agents, or gel inhibitors. Again, the choice of solvent or other polymerization additives should not limit the practice of the present invention.

In general, anionic polymerization reactions generally include the reaction of monomers by nucleophilic initiation to form and propagate a polymeric structure. Throughout the formation and propagation of the polymer, the polymeric structure is ionic or "living." A living polymer, therefore, is a polymeric segment having a living or reactive end. For example, when a lithium containing initiator is employed to initiate the formation of a polymer, the reaction will produce a reactive polymer having a lithium atom at its living or reactive end. For further information respecting anionic polymerizations, one can refer to PRINCIPLES OF POLYMERIZATION, $3^{RD}$ EDITION, by George Odian, John Wiley & Sons, Inc. (1991), Chapter 5, entitled *Ionic Chain Polymerization*.

The monomers that can be employed in preparing a living polymer that can be terminated according to this invention include any monomer capable of being polymerized according to anionic polymerization techniques. Again, reference can be made to Chapter 5 of PRINCIPLES OF POLYMERIZATION in this regard. Preferably, these monomers include those that lead to the formation of elastomeric homopolymers or copolymers. Suitable monomers include, without limitation, conjugated dienes having from about 4 to about 12 carbon atoms, monovinyl aromatic monomers having 8 to about 18 carbon atoms, trienes, and acrylates having from about 4 to about 23 carbon atoms. Examples of conjugated diene monomers include, without limitation, 1,3-butadiene, isoprene, 1,3-pentadiene, 2,3-dimethyl-1,3-butadiene, and 1,3-hexadiene. Aromatic vinyl monomers include, without limitation, styrene, alpha-methyl styrene, p-methylstyrene, vinyltoluene, and vinylnaphthalene. Examples of acrylate monomers include methacrylate, ethyl acrylate, butylacrylate, dodecyl acrylate, methyl methacrylate, butyl methacrylate, nonyl methacrylate, and octadecyl methacrylate. When preparing elastomeric copolymers, such as those containing conjugated diene monomer and aromatic vinyl monomers, the conjugated diene monomers and aromatic vinyl monomers are normally used at a ratio of 95-50:5-50, and preferably 95-65:5-35, respectively.

Likewise, any nucleophilic initiator can be employed to initiate the formation and propagation of the living polymers that can be terminated according to this invention. Preferably, however, lithium-based initiators are used. Exemplary initiators include, but are not limited to, alkyl lithium initiators, arenyllithium initiators, N-lithium dihydro-carbon amides, aminoalkyllithiums, and alkyl tin lithiums. More specifically, useful initiators include N-lithiohexamethyleneimide, N-lithiopyrrolidinide, and N-lithiododecamethyleneimide. Other initiators include organolithium compounds such as substituted aldimines, substituted ketimines, and substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441. Reference can also be made to Chapter 5 of PRINCIPLES OF POLYMERIZATION for sundry nucleophilic initiators.

Typically, polymerization is conducted in a polar solvent such as tetrahydrofuran (THF) or a non-polar hydrocarbon solvent such as the various cyclic and acyclic hexanes, heptanes, octanes, pentanes, their alkylated derivatives, and mixtures thereof.

In order to promote randomization in copolymerization and to control vinyl content, a polar coordinator may be added to the polymerization ingredients. Amounts range between 0.05 and about 90 or more equivalents per equivalent of lithium. The amount depends on the amount of vinyl desired, the level of styrene employed, and the temperature of the polymerization, as well as the nature of the specific polar coordinator (modifier) employed. Suitable polymerization modifiers include, for example, ethers or amines to provide the desired microstructure and randomization of the comonomer units.

Other compounds useful as polar coordinators are organic and include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, 1,4-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091 and the subject matter therein relating to these modifiers is incorporated herein by reference. Compounds useful as polar coordinators include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); linear THF oligomers; and the like.

Useful functionalizing agents include carbon dioxide; toluene diisocyanate (TDI); N,N,N',N'-tetra-alkyldiamino-benzophenone, such as tetramethyldiamino-benzophenone or the like; N,N-dialkylamino-benzaldehyde, such as dimethylamino-benzaldehyde or the like; 1,3-dialkyl-2-imidazolidinones, such as 1,3-dimethyl-2-imidazolidinone (DMI) or the like; 1-alkyl substituted pyrrolidinones, such as N-methyl pyrrolidinone (NMP); 1-aryl substituted pyrrolidinones; dialkyl- and dicycloalkyl-carbodiimides having from about 5 to about 20 carbon atoms, such as 1,3-dicyclohexyl carbodiimide (DCCD); as well as the following:

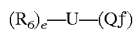

where U is tin or silicon. It is preferred that U is tin. $R_6$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_6$ may include methyl, ethyl, n-butyl, neophyl, phenyl, cyclohexyl or the like. Q is chlorine or bromine, "e" is from 0 to 3, and "f" is from about 1 to 4; where e+f=4.

Further, additional functionalizing agents include compounds expressed by the formulae

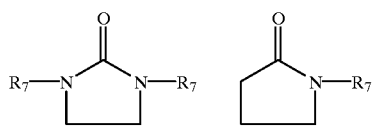

where each $R_7$ is the same or different and is an alkyl, cycloalkyl or aryl, having from about 1 to about 12 carbon atoms. For example, $R_7$ may include methyl, ethyl, nonyl, t-butyl, phenyl or the like. It should be appreciated that when $R_7$ is methyl, the above molecules are 1,3-dimethyl imidazolidinone (DMI) and N-methylpyrrolidine (NMP), respectively.

Additional functionalizing agents also include

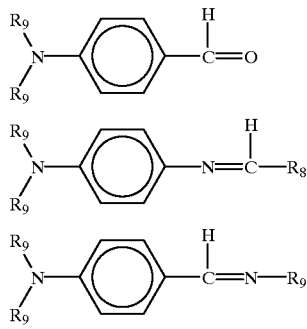

where $R_8$ is an alkyl, phenyl, alkylphenyl or dialkylaminophenyl, having from about 1 to about 20 carbon atoms. For example, $R_8$ may include t-butyl, 2-methyl-4-pentene-2-yl, phenyl, p-tolyl, p-butylphenyl, p-dodecylphenyl, p-diethyl-aminophenyl, p-(pyrrolidino) phenyl, and the like. Each $R_9$ is the same or different, and is an alkyl or cycloalkyl having from about 1 to about 12 carbon atoms. Two of the $R_9$ groups may together form a cyclic group. For example, $R_9$ may include methyl, ethyl, octyl, tetramethylene, pentamethylene, cyclohexyl or the like. When the $R_9$ groups are linked together as tetramethylene, it should be appreciated that the amino substituent is pyrrolidino.

Other examples of useful functionalizing agents include tin tetrachloride, $(R_{10})_3SnCl$, $(R_{10})_2SnCl_2$, $R_{10}SnCl_3$, carbodiimides, cyclic amides, cyclic ureas, isocyanates, Schiff bases, 4,4'-bis(diethylamino) benzophenone, and the like, where $R_{10}$ is an alkyl, cycloalkyl or aralkyl having from 1 to about 12 carbon atoms, and other reactive hysteresis-reducing terminating compounds which may contain other heteroatoms such as oxygen, nitrogen, sulfur, phosphorus, tin, non-interfering halogen, etc. Suitable functionalizing agents also include isomeric vinylpyridines. Exemplary amino groups formed by reaction with a terminating group that forms an amine includes any of the foregoing amine containing compounds, such as TDI, NMP, DMI, DCCD and the like The functionalizing agent is added to the reaction vessel, and the vessel is agitated for about 1 to about 1000 minutes. As a result, an elastomer is produced having an even greater affinity for compounding materials such as carbon black, and hence, even further reduced hysteresis. Additional examples of functionalizing agents include those found in U.S. Pat. No. 4,616,069 which is herein incorporated by reference for the disclosure of functionalizing agents.

Polymers produced according to this invention can be of any molecular weight depending on the intended application. Generally, for purposes of making tire products, the molecular weight of the elastomers should fall within the range from about 50,000 to about 1,000,000, preferably from 80,000 to about 500,000, and most preferably from about 100,000 to about 250,000. When used as a viscosity modifier, the molecular weight of the polymer should generally fall within the range from about 500 to about 50,000, preferably from about 1,500 to about 30,000, and most preferably from about 2,000 to about 15,000. The foregoing molecular weights represent the number-average molecular weight ($M_n$) as measured by GPC analysis with polystyrene as a standard. The molecular weight of the polymers that are produced in this invention are optimally such that a proton-quenched sample will exhibit a gum Mooney (ML/4/100) of from about 10 to about 150. Useful lower molecular weight compounds, however, can also be made, and they can be used as viscosity modifiers, as dispersants for particulates such as carbon black in oil, and as reactive modifiers for other polymers.

The polymer may be separated from the solvent by conventional techniques. These techniques include steam or alcohol coagulation, thermal desolventization, or any other suitable method. Additionally, solvent may be removed from the resulting polymer by drum drying, extruder drying, vacuum drying or the like.

A batch polymerization is typically begun by charging a blend of monomer(s) and normal alkane solvent to a suitable reaction vessel, followed by the addition of the polar coordinator (if employed) and an initiator compound. The reactants are heated to a temperature of about 20 to about 200° C., and the polymerization is allowed to proceed for about 0.1 to about 24 hours. This reaction produces a reactive polymer having a lithium atom at its reactive or living end.

In one preferred embodiment, the highly functionalized polymers prepared according to this invention are used within a vulcanizable composition of matter that is useful for fabricating tires. These compositions or stocks are useful for forming tire components such as treads, subtreads, black sidewalls, body ply skins, and the like. In this application or use, these elastomeric homopolymers and copolymers preferably include those prepared from conjugated diene monomers alone or in combination with vinyl aromatic monomers. These polymers include, without limitation, polybutadiene, styrene-butadiene copolymer, and isoprene.

The polymers prepared according to this invention can be used alone or in combination with other elastomers to prepare various tire component stock compounds. The other elastomers that may be blended with the polymers prepared according to this invention include synthetic polyisoprene rubber, styrene-butadiene copolymer rubber (SBR), polybutadiene, butyl rubber, poly(chloroprene), ethylene-propylene copolymer rubber, ethylene-diene terpolymer rubber (EPDM), acrylonitrile-butadiene copolymer rubber (NBR), silicone rubber, fluoroelastomers, ethylene-acrylic copolymer rubber, ethylene vinyl acetate copolymer (EVA), epichlorohydrin rubbers, chlorinated polyethylene rubbers, chlorosulfonated polyethylene rubbers, hydrogenated nitrile rubbers, tetrafluoroethylene-propylene copolymer rubber and the like. When the polymers of the present invention are blended with conventional rubbers, the amount can vary widely such as between about 10 and about 99 percent by weight of the conventional rubber.

Typically, these vulcanizable compositions of matter include a rubber component that is blended with reinforcing fillers and at least one vulcanizing agent. These compositions typically also include other compounding additives such as accelerators, oils, waxes, scorch inhibiting agents, and processing aids. As known in the art, vulcanizable compositions of matter containing synthetic rubbers typically include antidegradants, processing oils, zinc oxide, optional tackifying resins, optional reinforcing resins, optional fatty acids, optional peptizers, and optional scorch inhibiting agents.

These vulcanizable compositions are compounded or blended by using mixing equipment and procedures conventually employed in the art. Preferably, an initial masterbatch is prepared that includes the rubber component and the reinforcing fillers, as well as other optional additives such as processing oil and antioxidants. Once this initial masterbatch is prepared, the vulcanizing agents are blended into the composition. This vulcanizable composition of matter can then be processed according to ordinary tire manufacturing techniques. Likewise, the tires are ultimately fabricated by using standard rubber curing techniques. For further explanation of rubber compounding and the additives conventionally employed, one can refer to *The Compounding and Vulcanization of Rubber*, by Stevens in RUBBER TECHNOLOGY SECOND EDITION (1973 Van Nostrand Reihold Company), which is incorporated herein by reference.

The reinforcing fillers can include those fillers that are typically employed in rubber compounding. Some preferred fillers include those that are typically used in tire manufacturing including organic fillers such as carbon black and inorganic fillers such as silica. The reinforcing fillers are typically employed in amounts ranging from about 1 to about 200 parts by weight per 100 parts by weight rubber (phr), with about 5 to about 120 parts by weight (phr) being preferred, and with about 30 to about 100 parts by weight (phr) being most preferred.

The carbon blacks may include any of the commonly available, commercially-produced carbon blacks, but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

| CARBON BLACKS | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

When employed, silica can be used in the amount of about 1 part to about 200 parts by weight per 100 parts of polymer (phr), preferably in an amount from about 5 to about 120 phr. The useful upper range is limited by the high viscosity imparted by fillers of this type. Usually, both carbon black and silica are employed in combination as the reinforcing filler. When both are used, they can be used in a carbon black:silica ratio of from about 1:99 to about 99:1, more preferably from about 5:95 to about 95:5, and even more preferably from about 10:90 to about 90:10. Some of the commercially available silicas that may be used include: Hi-Sil™215, Hi-Sil™233, and Hi-Sil™190 (PPG Industries; Pittsburgh, Pa.). Also, a number of useful commercial grades of different silicas are available from a number of sources including Rhône Poulenc, PPG Industries, and Nippon Silica. Typically, a coupling agent is added when silica is used as a reinforcing filler. One coupling agent that is conventionally used is bis-[3(triethoxysilyl) propyl]-tetrasulfide, which is commercially available under the tradename SI69 (Degussa-Hüls; Germany).

The reinforced rubber compounds can be cured in a conventional manner with known vulcanizing agents at about 0.1 to about 4 phr, and more preferably from about 0.5 to about 2 phr. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3rd ed., Wiley Interscience, N.Y. 1982, Vol.20, pp.365–468, particularly *Vulcanization Agents and Auxiliary Materials* pp. 390–402., or *Vulcanization* by A. Y. Coran, ENCYCLOPEDIA OF POLYMER SCIENCE AND ENGINEERING, 2$^{nd}$Edition, John Wiley & Sons, Inc., 1989; both of which are incorporated herein by reference. Vulcanizing agents may be used alone or in combination. This invention does not affect cure times and thus the polymers can be cured for a conventional amount of time. Cured or crosslinked polymers will be referred to as vulcanizates for purposes of this disclosure.

In order to demonstrate the practice of the present invention, the following examples have been prepared and tested as described in the Examples Section disclosed hereinbelow. The examples should not, however, be viewed as limiting the scope of the invention. The claims will serve to define the invention.

EXAMPLES

Example I

Living polybutadiene polymers were prepared at low polymerization temperatures. These polymers were then divided into nine samples and each sample was subjected to different conditions. The polymers were then ultimately analyzed to determine whether the addition of lithium t-butoxide improved coupling with tin tetrachloride.

Specifically, polybutadienyllithium was prepared by admixing 3.21 Kg (7.07 lbs.) of a 25% by weight solution of 1,3-butadiene in hexane, 0.64 ml. of a 0.5 M solution of 2,2'-di (tetrahydrofuryl) propane in hexane, 5.75 ml. of a 1.0 M hexamethyleneimine in hexane, 3.90 ml. of a 1.63 M solution of n-butyllithium in hexane, and 1.71 Kg (3.76 lbs.) of dry hexane. This mixture was heated to about 49° C. (120° F.) for about 4 hours with agitation.

The resulting solution of polybutadienyllithium was divided and placed under pressure into nine capped and nitrogen-purged bottles. Three bottles were selected and subjected to three separate treatments. The polymer in the first bottle, Sample 1, was terminated with isopropanol. The polymers in the second bottle, Sample 2, was treated with tin tetrachloride for 30 minutes at 49° C. (120° F.), the amount of tin tetrachloride that was added was about 90% of theory based upon the amount of butyllithium. The third bottle, Sample 3, was likewise treated with tin tetrachloride, for 30 minutes at 49° C. (120° F.), after the addition of lithium t-butoxide; the amount of tin tetrachloride that was added was likewise about 90% of theory based upon the amount of butyllithium employed, and the amount of lithium t-butoxide that was added was a molar equivalent to the amount of butyllithium added.

The fourth, fifth, and sixth bottles, corresponding to Sample 4, 5 and 6, were subjected to heat treatment at about 80° C. (186° F.) for about 30 minutes. Lithium t-butoxide was added to Sample 6, before the heat treatment. Following this heat treatment, the polymer in Sample 4 was terminated with isopropanol in a similar fashion to Sample 1, the polymers in Samples 5 and 6 were treated with tin tetrachloride in a similar fashion to Samples 2 and 3.

The seventh, eighth, and ninth bottles, corresponding to Samples 7, 8, and 9, were subjected to heat treatment at about 80° C. (186° F.) for about 60 minutes. Lithium t-butoxide was added to Sample 9 before the heat treatment. Sample 7 was then treated with isopropanol in a similar fashion to Samples 1 and 4, and Samples 8 and 9 were treated with tin tetrachloride in a similar fashion to Samples 2 and 3.

The resulting polymers were then analyzed to determine the percentage of polymer that coupled. This analysis was performed by using gel permeation chromatography (GPC). Table I below provides the results of this analysis and specifically provides the percentage of polymers within each composition that were found to be coupled.

TABLE I

| Sample | Functionalization Technique | Percent by Weight Coupled |
| --- | --- | --- |
| No Heat Treatment | | |
| 1 | Isopropanol | 0.4 |
| 2 | SnCl$_4$ | 72.6 |
| 3 | SnCl$_4$ & t-BuOLi | 74.7 |
| Heated for 30 min | | |
| 4 | Isopropanol | 3.4 |
| 5 | SnCl$_4$ | 53.5 |
| 6 | SnCl$_4$ & t-BuOLi (prior to heating) | 63.0 |
| Heated for 60 min | | |
| 7 | Isopropanol | 10.3 |
| 8 | SnCl$_4$ | 36.4 |
| 9 | SnCl$_4$ & t-BuOLi (prior to heating) | 54.7 |

It can be seen from the data in Table I that the addition of lithium t-butoxide substantially improves polymer coupling, especially at higher temperatures.

Example II

Two batches of polybutadiene polymers were prepared at high polymerization temperatures, subsequently subjected to heat treatment for various time intervals, and then coupled with tin tetrachloride. Lithium t-butoxide was added to one batch prior to the attainment of a peak polymerization temperature. The resulting polymers were analyzed for percent polymer conversion and percent coupling.

Specifically, the first batch was prepared by reacting 3.18 Kg (7.01 lbs.) of a 25 percent solution of 1,3-butadiene monomer in hexane, 0.43 ml of a 0.5 M 2,2'-di (tetrahydrofuryl) propane in hexane, 5.75 ml. of a 1.0 M hexamethyleneimine in hexane, 3.90 ml. of a 1.63 M solution of n-butyllithium in hexane, and 1.67 Kg (3.68 lbs.) of dry hexane. The reaction mixture was heated to 55° C. (131° F.) and a peak polymerization temperature of 90.5° C. (195° F.) was observed. Following this peak temperature, the reaction mixture was maintained at higher temperature by setting the reactor jacket to 93° C. (200° F.) for various time intervals as set forth in Table II below. Following this heat treatment, the percent polymer conversion was determined by gas chromatography for 1,3-butadiene, and coupling with tin tetrachloride was subsequently effected by adding tin tetrachloride in an amount equal to about 90% of theory based upon the amount of butyllithium. As with Example I, the percent coupling was determined by using GPC. The results of polymer conversion and percent coupling are provided in Table II.

A second batch was prepared by using the same ingredients as set forth for the first batch except that lithium t-butoxide was injected into the reaction mixture when the mixture attained a temperature of about 86° C. (187° F.). That is, the lithium t-butoxide was added just prior to the peak polymerization temperature, which was about 91.4° C. (196.5° F.). Various samples of this batch were likewise subjected to post polymerization heat treatment by maintaining a 93° C. (200° F.) reactor jacket temperature for the time intervals disclosed in Table II. Also, the samples were analyzed for percent conversion, and then coupled with tin tetrachloride in an amount equal to about 90% theory based upon the amount of butyllithium. The polymers were analyzed for percent coupling as disclosed above. These results are likewise provided in Table II.

TABLE II

| Lithium t-butoxide | Batch I<br>No | Batch II<br>Yes |
|---|---|---|
| Conversion to Polymer (%)<br>Heat Treatment (min) | | |
| 15 | 99.8 | 99.4 |
| 30 | 99.8 | 99.6 |
| 50 | 99.9 | — |
| 60 | — | 99.9 |
| Coupling with SnCl$_4$ (%)<br>Heat Treatment (min) | | |
| 15 | 47 | 64 |
| 30 | 33 | 58 |
| 50 | 20 | — |
| 60 | — | 42 |

The results set forth in Table II again demonstrate that the presence of lithium t-butoxide improves the coupling efficiency of tin tetrachloride. Additionally, this example shows that lithium t-butoxide can be added to a polymerization reaction mixture—and effect improved coupling efficacy—up until a time just before a peak polymerization temperature is achieved.

Example III

Two batches of styrene-butadiene copolymer were prepared at high polymerization temperatures. Lithium t-butoxide was added to the reaction mixtures at initial mixing. The polymers were coupled with tin tetrachloride and the percent polymer coupling was determined.

Specifically, a first batch of styrene-butadiene copolymer was prepared by charging the reactor with 549 grams (1.21 lbs.) of a 33.0% styrene solution in hexane, 2.12 Kg (4.67 lbs.) of 25.7% 1,3-butadiene solution in hexane, 7.8 ml. of 0.5 M 2,2'-di (tetrahydrofuryl) propane in hexane, 3.08 ml. of 1.95 M hexamethyleneimine in hexane, 3.80 ml. of 1.72 M solution of n-butyllithium in hexane, 6.4 ml. of 1.03 M solution of lithium t-butoxide in hexane, and an additional 1.75 Kg (3.85 lbs.) of dry hexane. This reaction mixture was heated by increasing the jacket temperature to about 117° C. (242° F.) until the batch temperature reached about 74° C. (165° F.). The mixture was then jacketed with cold water for about 80 seconds, and then again heated by increasing the jacket temperature to about 49° C. (120° F.) for the remainder of the reaction period. A peak polymerization temperature of about 97° C. (207° F.) was achieved. The mixture was then allowed to cool, and tin tetrachloride was added when the mixture was at about 74° C. (165° F.). The amount of tin tetrachloride added was about 80% of theory based upon the n-butyllithium that was charged. The tin tetrachloride was allowed to react for about 30 minutes and then the polymer was isolated by coagulation in excess isopropanol, and then drum-dried. The polymeric composition was analyzed for percent coupling by using the same procedure as in Examples I and II, the results of which are reported in Table III.

A second batch was similarly prepared except that the jacket temperature was increased resulting in a peak polymerization temperature of about 108° C. (227° F.). Tin coupling was likewise effected and the polymeric composition was similarly analyzed for percent coupling. The results of this analysis are provided in Table III.

TABLE III

| Batch | Peak<br>Polymerization | Coupling with<br>SnCl$_4$ |
|---|---|---|
| 1 | 97° C. | 84 |
| 2 | 108° C. | 68 |

Example IV

Three batches of polybutadiene were prepared and, in two of the batches, lithium t-butoxide was added during the polymerization exotherm. The polymers were then coupled with tin tetrachloride and the percent polymer coupling was determined.

Specifically, the first batch was prepared by reacting 3.30 Kg (7.3 lbs.) of a 24.1 percent solution of 1,3-butadiene monomer in hexane, 0.43 ml of a 0.5 M 2,2'-di (tetrahydrofuryl) propane in hexane, 5.75 ml. of a 1.0 M hexamethyleneimine in hexane, 3.90 ml. of a 1.63 M solution of n-butyllithium in hexane, and 1.54 Kg (3.39 lbs.) of dry hexane. The reaction mixture was heated to about 57° C. (135° F.), and a peak polymerization temperature of about 101° C. (213° F.) was observed. The percent polymer conversion was determined by gas chromatography for 1,3-butadiene, and coupling with tin tetrachloride was subsequently effected by adding tin tetrachloride in an amount equal to about 90% of theory based upon the amount of butyllithium. The percent coupling was determined by using GPC. Notably, only about 44% coupling of the product was observed.

A second and third batch was prepared by using the same ingredients as set forth for the first batch except that lithium t-butoxide was injected into the reaction mixture when the mixture attained a temperature of about 87° C. (188° F.) in the second batch and about 77° C. (170° F.) in the third batch. Samples of these polymerizations were analyzed for percent conversion, and then coupled with tin tetrachloride in an amount equal to about 90% of theory based upon the amount of butyllithium. The polymers were analyzed for percent coupling as discussed above.

TABLE IV

| | Batch I | | Batch II | | Batch III | |
|---|---|---|---|---|---|---|
| Lithium t-butoxide | No | | Yes | | Yes | |
| Peak Temperature (° F.) | 213 | | 199 | | 187 | |
| Time After Peak<br>Temperature (min) | % Conversion | % Coupling | % Conversion | % Coupling | % Conversion | % Coupling |

TABLE IV-continued

| | | | | | | |
|---|---|---|---|---|---|---|
| 0 | 100 | 44 | 95 | — | 93 | — |
| 6 | — | — | 98 | 75 | 96 | 79 |
| 20 | — | — | 99 | 73 | 98 | 77 |
| 41 | — | — | 99 | 72 | — | — |
| 46 | — | — | — | — | 99 | 76 |

Various modifications and alterations that do not depart from the scope and spirit of this invention will become apparent to those skilled in the art. This invention is not to be duly limited to the illustrative embodiments set forth herein.

What is claimed is:

1. A process for preparing highly functionalized polymers comprising the steps of:
   admixing anionically-polymerizable monomers and at least one anionic-polymerization initiator to form an admixture of living polymers;
   adding at least one lithium alkoxide stabilizer to the admixture of living polymers to form a stabilized admixture, where said step of adding at least one lithium alkoxide stabilizer occurs after initial polymerization of the anionically-polymerizable monomers and before attaining a peak polymerization temperature; and
   adding a functionalizing agent to the stabilized admixture.

2. The process of claim 1, where the lithium alkoxide stabilizer is selected from stabilizers defined by the formula $R_1$—O—Li where $R_1$ is an aliphatic, cycloaliphatic, or aryl group.

3. The process of claim 2, where the aliphatic group is selected from alkyl groups having 1 to about 16 carbon atoms or alkenyl groups having 1 to about 16 carbon atoms, and where the cycloaliphatic groups include up to about 8 carbon atoms within the ring.

4. The process of claim 1, where said step of adding at least one lithium alkoxide stabilizer includes adding reactants to form the stabilizer in situ.

5. The process of claim 1, where the functionalizing agent is toluene diisocyanate, N,N,N',N'-tetra-alkyldiaminobenzophenone, N,N-dialkylamino-benzaldehyde, 1,3-dialkyl-2-imidazolidinones, 1-alkyl substituted pyrrolidinones, 1-aryl substituted pyrrolidinones, dialkyl- and dicycloalkyl-carbodiimides having from about 5 to about 20 carbon atoms, or mixtures thereof.

6. The process of claim 1, where the functionalizing agent is defined by the formula $(R_6)_e$—U—$(Q_f)$ where U is tin or silicon, each $R_6$, which may be the same or different, is an alkyl having from about 1 to about 20 carbon atoms, a cycloalkyl having from about 3 to about 20 carbon atoms, an aryl having from about 6 to about 20 carbon atoms, or an aralkyl having from about 7 to about 20 carbon atoms, each Q, which may be the same or different, is chlorine or bromine, e is an integer form 0, to 3, $f$ is an integer from about 1 to 4, and the sum of e and $f$ is 4.

7. The process of claim 1, where the functionalizing agent is defined by one of the formulae

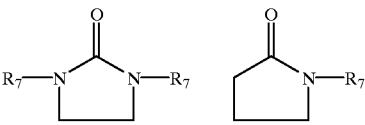

where each $R_7$, which may be the same or different, is an alkyl, cycloalkyl or aryl having from about 1 to about 12 carbon atoms, or mixtures thereof.

8. The process of claim 1, where the functionalizing agent is defined by one of the formulae

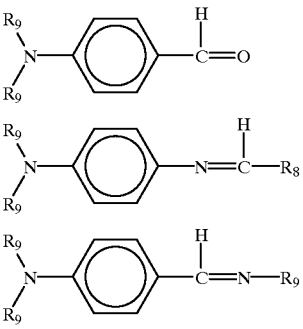

where $R_8$ is an alkyl, phenyl, alkylphenyl or dialkylaminophenyl having from about 1 to about 20 carbon atoms and each $R_9$, which may be the same or different, is an alkyl or cycloalkyl having from about 1 to about 12 carbon atoms, or mixtures thereof.

9. The process of claim 1, where the functionalizing agent is tin tetrachloride, $(R_{10})_3SnCl$, $(R_{10})_2SnCl_2$, $R_{10}SnCl_3$, carbodiimides, cyclic amides, cyclic ureas, isocyanates, Schiff bases, 4,4'-bis(diethylamino) benzophenone, and isomeric vinylpyridines, where $R_{10}$ is an alkyl, cycloalkyl or aralkyl having from 1 to about 12 carbon atoms, or mixtures thereof.

10. The process of claim 1, where the amount of lithium alkoxide stabilizer that is added is based upon a molar ratio of lithium alkoxide to anionic-polymerization initiator of from about 1:0.5 to about 1:2.2.

11. The process of claim 10, where the anionic-polymerization initiator consists essentially of a lithium-containing initiator.

12. A highly functionalized polymer prepared by the steps comprising:
   admixing anionically-polymerizable monomers and at least one anionic-polymerization initiator to form an admixture of living polymers;
   adding at least one lithium alkoxide stabilizer to the admixture of living polymers to form a stabilized admixture, where said step of adding at least one lithium alkoxide stabilizer occurs after initial polymerization of the anionically-polymerizable monomers and before attaining a peak polymerization temperature; and adding a functionalizing agent to the stabilized admixture.

13. The polymer of claim 12, where the lithium alkoxide stabilizer is selected from stabilizers defined by the formula $$R_1\text{—O—Li}$$

where $R_1$ is an aliphatic, cycloaliphatic, or aryl group.

14. A process for preparing highly functionalized polymers comprising the steps of:

admixing anionically-polymerizable monomers and at least one anionic-polymerization initiator to form an admixture of living polymers, where said anionic polymerization initiator consists essentially of a lithium-containing initiator;

adding at least one lithium alkoxide stabilizer to the admixture of living polymers to form a stabilized admixture, where said step of adding at least one lithium alkoxide stabilizer occurs after initial polymerization of the anionically-polymerizable monomers and before attaining a peak polymerization temperature; and adding a functionalizing agent to the stabilized admixture.

15. The method of claim 14, where the lithium alkoxide stabilizer is selected from stabilizers defined by the formula $$R_1\text{—O—Li}$$

where $R_1$ is an aliphatic, cycloaliphatic, or aryl group.

16. The method of claim 15, where the aliphatic group is selected from alkyl groups having 1 to about 16 carbon atoms or alkenyl groups having 1 to about 16 carbon atoms, and where the cycloaliphatic groups include up to about 8 carbon atoms within the ring.

17. The process of claim 14, where the amount of The process of claim 1, where the amount of lithium alkoxide stabilizer that is added is based upon a molar ratio of lithium alkoxide to anionic-polymerization initiator of from about 1:0.5 to about 1:2.2.

18. The polymer of claim 13, where said anionic polymerization initiator consists essentially of a lithium-containing initiator, and where the amount of lithium alkoxide stabilizer that is added is based upon a molar ratio of lithium alkoxide to anionic-polymerization initiator of from about 1:0.5 to about 1:2.2.

* * * * *